(12) United States Patent (10) Patent No.: US 8,108,088 B2
Closse et al. (45) Date of Patent: Jan. 31, 2012

(54) METHOD AND DEVICE FOR AUTOMATICALLY GUIDING AN AIRCRAFT DURING A SPACING FLIGHT WITH A LANDING

(75) Inventors: Julien Closse, Colomiers (FR); Jean-Louis De Menorval, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 539 days.

(21) Appl. No.: 12/340,730

(22) Filed: Dec. 21, 2008

(65) Prior Publication Data

US 2009/0171519 A1 Jul. 2, 2009

(30) Foreign Application Priority Data

Dec. 21, 2007 (FR) ...................................... 07 09012

(51) Int. Cl.
*G06F 19/00* (2006.01)
(52) U.S. Cl. ........................... 701/16; 701/120; 340/945
(58) Field of Classification Search .......................... None
See application file for complete search history.

(56) References Cited

U.S. PATENT DOCUMENTS

| 6,718,236 | B1 | 4/2004 | Hammer | |
| 7,912,593 | B2 * | 3/2011 | Ridenour | 701/3 |
| 2004/0075586 | A1 | 4/2004 | Glover | |
| 2006/0200279 | A1 * | 9/2006 | Ainsworth et al. | 701/16 |
| 2007/0061055 | A1 * | 3/2007 | Stone et al. | 701/2 |

OTHER PUBLICATIONS

Preliminary Search Report dated Jul. 28, 2008 w/ English translation.
J. Hull, et al., "Technology-enabled airborne spacing and merging," Digital Avionics Systems Conference, 2004, DASC 04. The 23rd Salt Lake City, UT, USA Oct. 24-28, 2004, Piscataway, NJ, USA, IEEE, US, vol. 1, Oct. 24, 2004, pp. 2.B.4-2.1, XP010764943, ISBN; 978-0-7803-8539-9.
L. Crane et al., "Monte Carlo simulation of an ADS-B application: flight deck based merging and spacing," 2007 Integrated Communications, Navigation and Surveillance Conference May 1-3, 2007 Herndon, VA, USA, IEEE Proceedings of the 2007 Integrated Communications, Navigation and Surveillance Conference IEEE Piscataway, NJ, USA, May 1, 2007, pp. 1-27, XP002488081.

* cited by examiner

*Primary Examiner* — Michael J. Zanelli
(74) *Attorney, Agent, or Firm* — Dickinson Wright PLLC

(57) ABSTRACT

Disclosed is a method and device for automatically guiding separation of a follow aircraft from a lead aircraft. The method involves determining first guidance instructions based on a speed that enables a desired separation between the lead and follow aircraft, and determining second guidance instructions based on a speed for performing a desired landing procedure for the follow aircraft. A current energy state of the follow aircraft is monitored to detect an incompatibility situation in which the current energy state of the follow aircraft is incompatible with execution of the desired landing procedure.

10 Claims, 3 Drawing Sheets

METHOD AND DEVICE FOR AUTOMATICALLY GUIDING AN AIRCRAFT DURING A SPACING FLIGHT WITH A LANDING

FIELD OF THE INVENTION

The present invention relates to a method and a device for automatically guiding an aircraft, called following aircraft, which follows, with a particular separation according to a separation maneuver, an aircraft, called followed aircraft, which precedes it, in a landing procedure, in particular on a runway of an airport.

BACKGROUND OF THE INVENTION

It is estimated that, with the constant increase in air traffic, the latter will triple in the next twenty years. Also, new methods are sought to avoid saturation of the busiest airport platforms. One of these methods consists in delegating to an aircraft (following aircraft), in particular a transport airplane, the automatic performance of a separation maneuver relative to another aircraft (followed aircraft) which flies in front of it, in the terminal areas of air traffic control. With such a method, an air traffic controller indicates to the following aircraft, using a standard radiocommunication system, which aircraft it should follow, the type of maneuver to be performed, and the separation value to be observed, which is generally given as a time value. The following aircraft will then, automatically, acquire then maintain the required separation, by applying successive thrust commands, which are calculated according to the relative position of the following aircraft relative to the followed aircraft. The performance of such an automatic separation maneuver makes it possible to increase the landing and take-off capabilities of the runways of an airport, by optimizing the distances between the aircraft (on landing and on take-off).

However, the speed variations needed to regulate the separation of the following aircraft, relative to the followed aircraft, which can present different performance levels, coupled with a vertical profile that is generally in descent, can increase the energy of the following aircraft, until it is made too great to enable this following aircraft to perform a landing in the required safety conditions. The following aircraft, in this situation not being able to decelerate sufficiently, is then obliged to go around and try a new approach. Such a go-around procedure is costly to the airline and runs contrary to the prime objective of automatic separation, namely to increase the capacity of the runways.

SUMMARY OF THE INVENTION

The object of the present invention is to remedy these drawbacks. It relates to a method of automatically guiding an aircraft, called following aircraft, which is likely to follow, with a particular separation according to a separation maneuver, an aircraft, called followed aircraft, which precedes it, in a landing procedure, the method making it possible notably to avoid unwanted go-arounds of the abovementioned type.

To this end, according to the invention, said method is noteworthy in that, when a guidance of the following aircraft is engaged, the following operations are performed automatically:
a) first guidance instructions are determined, intended to have the following aircraft fly at a speed enabling it to follow the followed aircraft with said particular separation (which is, preferably, given as a time value);
b) second guidance instructions are determined, intended to have the following aircraft fly at a speed enabling it to perform the landing procedure;
c) the current energy state of the following aircraft is monitored, so as to be able to detect an incompatibility situation, for which the current energy state of the following aircraft is too high and is incompatible with the execution of a landing procedure; and
d) there are applied to the following aircraft:
   d1) said first guidance instructions, in normal situation in the absence of detection of an incompatibility situation; and
   d2) said second guidance instructions, immediately an incompatibility situation is detected and as long as this incompatibility situation lasts.

Thus, thanks to the invention, when the energy state of the following aircraft becomes incompatible with the execution of a landing procedure, because of an excessive speed, second guidance instructions are applied to the aircraft, determined so as to enable the performance of such a landing procedure (and this instead of first guidance instructions which are formed so as to enable the following aircraft to follow with a particular separation the followed aircraft which precedes it). In such an incompatibility situation, the priority is therefore given to maintaining the landing capacity at the cost of maintaining a separation (relative to a separation maneuver).

On the other hand, as long as an incompatibility situation of this type is not detected, said first guidance instructions are applied to the following aircraft, which are intended to have this following aircraft fly at a speed enabling it to follow the followed aircraft with said abovementioned separation according to a separation maneuver.

Consequently, the present invention makes it possible to prevent unwanted go-arounds as mentioned above, by automatically checking, throughout the separation maneuver, the current energy state of the following aircraft, in order that it remains compatible with the execution of an approach procedure with a view to a landing (with, if necessary, a limitation on the guidance instructions relating to speed).

In the context of the present invention, the energy state of an aircraft should be understood to mean the sum of the energies acquired by the aircraft in a flight due mainly to its speed and to its altitude (kinetic energy and potential energy).

Advantageously, an incompatibility situation is detected when the horizontal distance, between the current position of the following aircraft and the threshold of a runway used by this following aircraft for its landing, is less than a minimum approach distance relative to a particular approach procedure with a view to a landing.

Moreover, in a first embodiment:
in the step b), second guidance instructions are determined, making it possible to perform a gradual deceleration of the following aircraft according to a predetermined deceleration law; and
in the step c):
   the horizontal distance, between the current position of the following aircraft and the threshold of a runway used by this following aircraft for its landing, is compared to a minimum approach distance relative to a particular approach procedure with a view to a landing; and
   an incompatibility situation is detected when said horizontal distance, between the current position of the following aircraft and the threshold of a runway used by this following aircraft for its landing, is less than said minimum approach distance relative to a particular approach procedure with a view to a landing.

Furthermore, in a second embodiment:
in the step a), first guidance instructions are calculated, corresponding to separation set points expressed as speed;
in the step b), a maximum speed that the following aircraft must observe to retain a landing capacity is calculated, this maximum speed representing said second guidance instructions; and
in the step c), said separation set points are compared to said maximum speed and an incompatibility situation is detected when said separation set points are greater than said maximum speed.

Moreover, advantageously, in a preliminary step:
the speed and the altitude that the following aircraft will have when it has acquired said particular separation relative to the followed aircraft are estimated (at a point of acquisition);
from said speed and said altitude, the corresponding energy state of the following aircraft is deduced (at this point of acquisition); and
a check is carried out to see if this energy state is compatible or incompatible with the execution of a landing procedure.

In this case, in a first embodiment variant, for which said speed and said altitude are values set in advance, said (automatic) guidance of the following aircraft is not engaged, if its energy state is incompatible with the execution of a landing procedure.

Furthermore, in a second embodiment variant, for which at least one of the parameters between the speed and the altitude is estimated, a warning signal is emitted, if the energy state of the following aircraft is incompatible with the execution of a landing procedure.

The present invention also relates to a device for automatically guiding an aircraft, called following aircraft, in particular a transport airplane (civilian or military), which follows, with a particular separation according to a separation maneuver, an aircraft, called followed aircraft, which precedes it, in a landing procedure.

According to the invention, this automatic guidance device which is on board the following aircraft, is noteworthy in that it comprises:
means for automatically determining first guidance instructions intended to have the following aircraft fly at a speed enabling it to follow the followed aircraft with said particular separation;
means for automatically determining second guidance instructions intended to have the following aircraft fly at a speed enabling it to perform the landing procedure;
means for automatically monitoring the current energy state of the following aircraft so as to be able to detect an incompatibility situation, for which the current energy state of the following aircraft is too high and is incompatible with the execution of a landing procedure; and
means for automatically applying, to the following aircraft:
said first guidance instructions, in a normal situation in the absence of detection of an incompatibility situation; and
a said second guidance instructions, immediately an incompatibility situation is detected and as long as this incompatibility situation lasts.

Furthermore, in a particular embodiment, said automatic guidance device further comprises means for engaging said automatic guidance device.

It is known that the landing capacity of an aircraft is linked to its capacity to lose energy. Also, for an aircraft to be able to land in total safety, its total energy must reach a low level, which depends mainly on its landing speed and the altitude of the runway. The device according to the invention is able to detect, during a separation maneuver, an incompatibility situation for which the current energy state of the following aircraft is too high and therefore represents a surplus energy situation, and it automatically introduces, in case of detection of such a surplus energy situation, limitations enabling the following aircraft to maintain an energy state compatible with the execution of a landing. In such a surplus energy situation, the device according to the invention therefore gives priority to maintaining the landing capacity at the cost of maintaining a separation (relative to a separation maneuver).

The present invention also relates to an aircraft which is fitted with an automatic guidance device such as that mentioned above.

BRIEF DESCRIPTION OF THE DRAWINGS

The figures of the appended drawing will clearly show how the invention can be produced. In these figures, identical references denote similar elements.

DETAILED DESCRIPTION OF THE INVENTION

Figure 1:
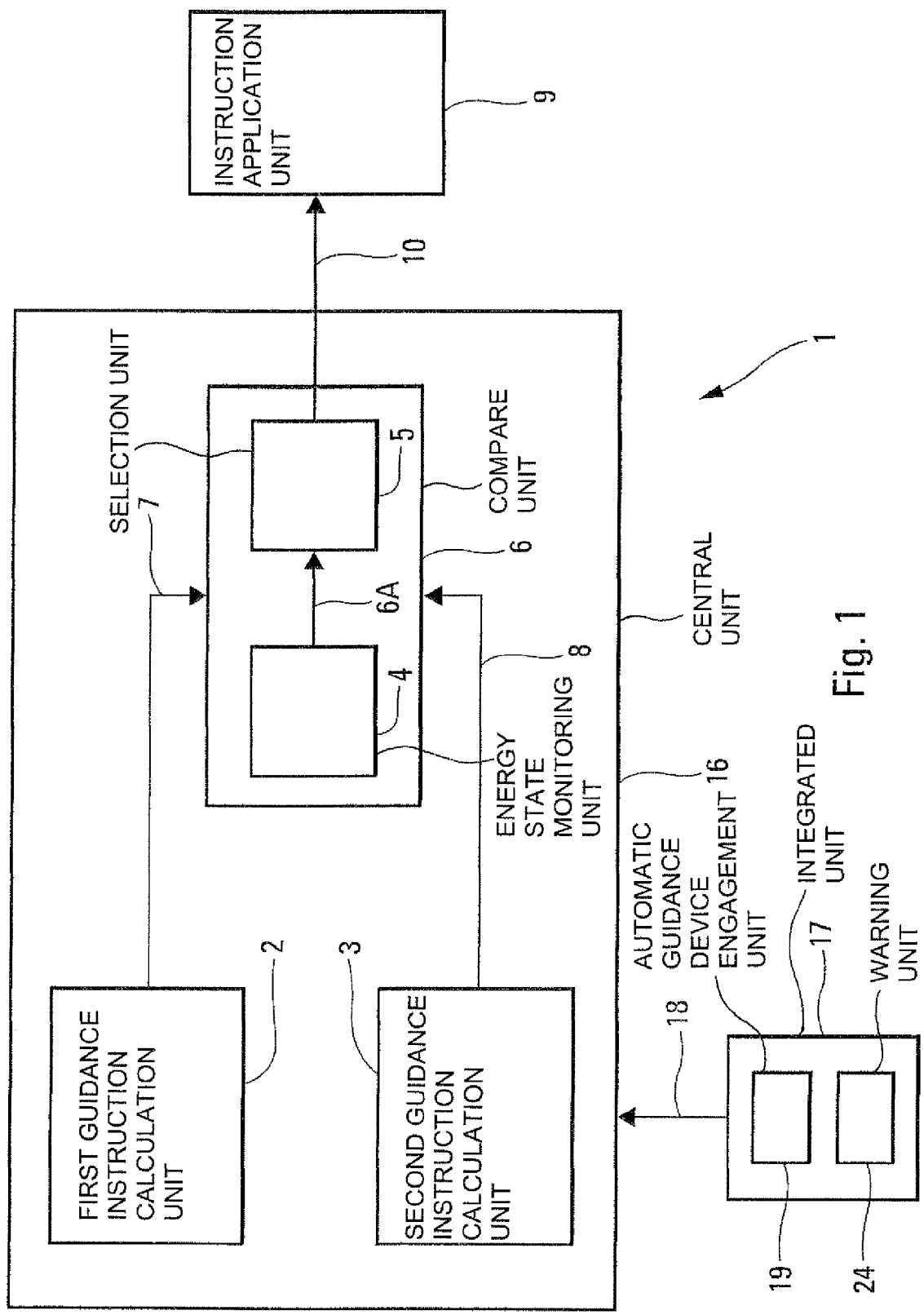
FIG. 1 is the block diagram of a device according to the invention.

The device 1 according to the invention and diagrammatically represented in FIG. 1 is intended to automatically guide an aircraft, called following aircraft, which is not represented. This automatic guidance device 1 is intended to guide the following aircraft, in particular a transport airplane, civilian or military, in order for it to follow, with a particular separation according to a standard separation maneuver, an aircraft (not represented), called followed aircraft, which precedes it. In the context of the present invention, this automatic guidance according to a separation maneuver must be performed at least during a procedure for landing the following aircraft on an airport, that is, on the approach to the runway used for the landing, and on the landing proper on this runway.

In order in particular to avoid unwanted go-arounds on such a landing procedure, said automatic guidance device 1 which is on board the following aircraft, comprises:
means 2 for automatically determining first guidance instructions (longitudinal) which are intended to have the following aircraft fly according to a required separation maneuver. More specifically, these first guidance instructions are intended to have the following aircraft fly at a speed that enables it to follow the followed aircraft with a particular separation according to separation maneuver envisaged;
means 3 for automatically determining second guidance instructions (longitudinal) which are intended to have the following aircraft fly at a speed that must not be too high so as to enable said following aircraft to perform the planned landing procedure;
means 4 for automatically monitoring the current energy state of the following aircraft. In the context of the present invention, the energy state of an aircraft is understood to be the sum of the energies acquired by the aircraft in a flight due mainly to its speed and to its altitude (kinetic energy and potential energy). Said means 4 can detect, in this monitoring, an incompatibility situation, for which the current energy state of the following aircraft is too high and is incompatible with the execution of a landing procedure. Obviously, if such an incompatibility situation is not detected, a compatibility situation applies, for which the current energy state of the following aircraft is compatible with the execution of the planned landing procedure;

means 5 which are, for example, linked via a link 6A to said means 4 and which are part, with the latter, of a unit 6 which is linked via links 7 and 8 respectively to said means 2 and 3. These means 5 are formed so as to automatically select, according to the monitoring performed by said means 4, said first guidance instructions or said second guidance instructions. More specifically, said means 5 select:

a said first guidance instructions, in a normal energy situation, that is in the absence of detection of an incompatibility situation; and said second guidance instructions, immediately an incompatibility situation is detected and as long as this incompatibility situation lasts; and means 9 which are linked via a link 10 to said means 5 and which are formed so as to automatically apply to the following aircraft, in a usual way, the (first or second) longitudinal guidance instructions selected by said means 5.

Thus, when the energy state of the following aircraft becomes incompatible with the execution of a landing procedure, because of an excessive speed, the device 1 according to the invention automatically applies to this following aircraft second longitudinal guidance instructions which are determined in such a way as to enable such a landing procedure to be performed (and this instead of first longitudinal guidance instructions which are formed so as to enable the following aircraft to follow with a particular separation the followed aircraft which precedes it).

On the other hand, as long as an incompatibility situation of this type is not detected, the device 1 automatically applies to the following aircraft said first guidance instructions which are then intended to have this following aircraft fly at a speed that enables it to follow the followed aircraft with said above-mentioned separation according to a separation maneuver.

Consequently, the automatic guidance device 1 according to the present invention makes it possible to prevent unwanted go-arounds of the following aircraft in a landing procedure, by automatically monitoring, throughout the separation maneuver, the current energy state of said following aircraft, and by adapting it if necessary so that it remains compatible with the execution of an approach procedure with a view to a landing (by limiting in this case its speed).

Said means 2 are intended to automatically determine first guidance instructions which make it possible:

if this is not yet the case, to acquire the particular separation which is required by the separation maneuver; and immediately this acquisition is achieved, to maintain this particular separation.

Usually, to acquire the required particular separation, said first guidance instructions must have the following aircraft fly at a speed making it possible to arrive at a particular point of acquisition with the required separation, relative to the followed aircraft. Furthermore, to automatically maintain this required separation, from this point of acquisition, said first guidance instructions must be such that they make it possible to apply successive thrust commands to the following aircraft. In the latter case, said first guidance instructions are, in particular, calculated according to the relative distance of the following aircraft relative to the followed aircraft and according to the current speed of said followed aircraft.

Figure 2:
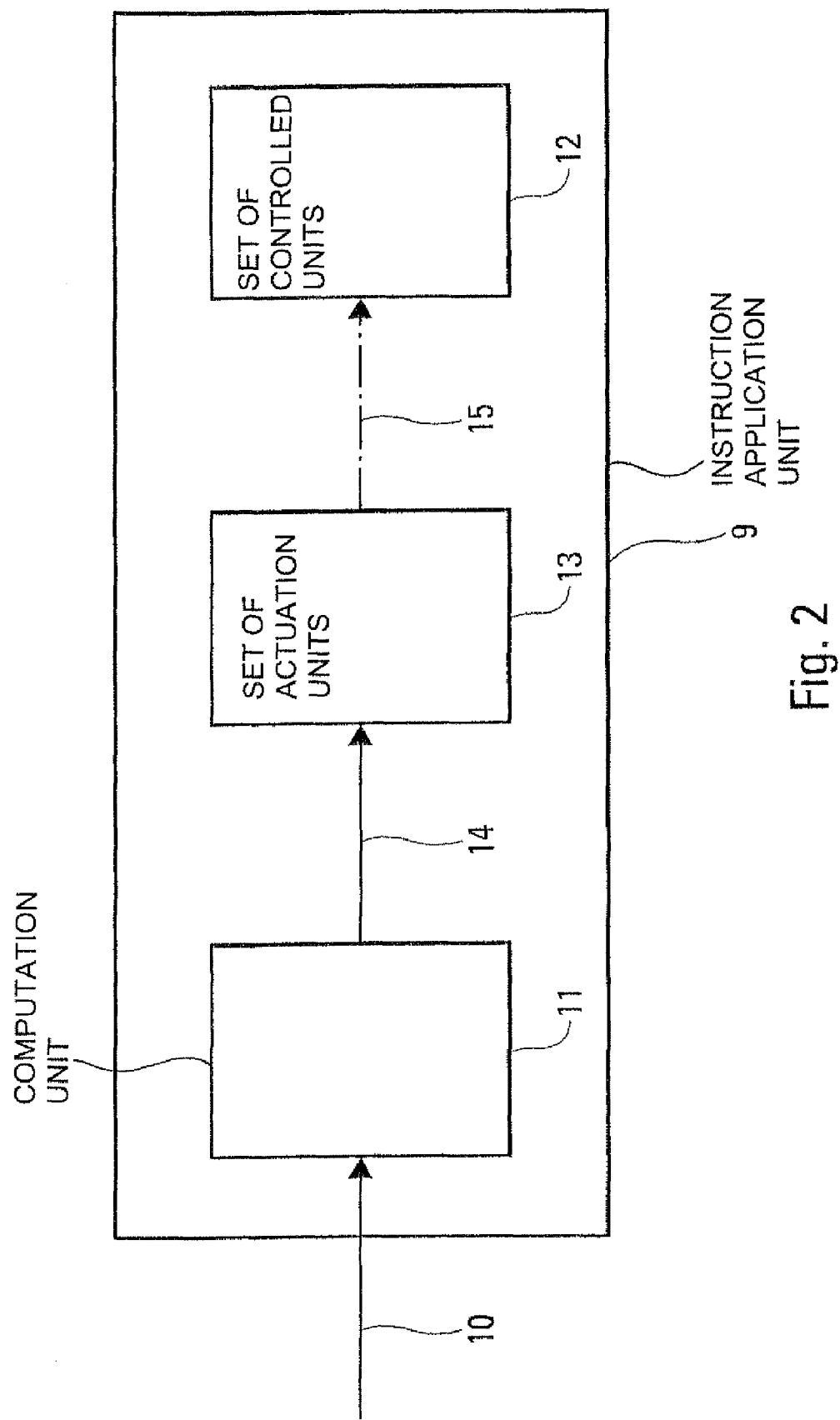
FIG. 2 diagrammatically illustrates means for applying guidance instructions, which are part of a device according to the invention.

Furthermore, in a preferred embodiment represented in FIG. 2, said means 9 comprise:

a computation unit 11 which is linked to said means 5 by the link 10 and which, in the usual way, generates thrust set points for the following aircraft according to the (first or second) longitudinal guidance instructions received from said means 5;

a set 12 of controlled means, in particular engines of the following aircraft, which make it possible to act on the speed of said following aircraft; and a set 13 of actuation means which receive the thrust set points from said computation unit 11 via a link 14 and which apply these thrust set points to said controlled elements of the set 12, as illustrated by a link 15 in chain dotted lines.

In a particular embodiment, said means 2, 3, 4 and 5 can be part of a central unit 16, as represented in FIG. 1. Furthermore, in a particular embodiment variant, said computation unit 11 of the means 9 can also be part of this central unit 16.

Moreover, in a preferred embodiment, said device 1 also comprises means 19 which are part of a unit 17 (which is linked via a link 18 to said central unit 16) and which are formed so to engage automatically, if particular conditions are met, said automatic guidance device 1, as specified hereinbelow. To do this, in a particular embodiment, said unit 17 comprises integrated elements (not represented) for respectively:

estimating the speed and the altitude that the following aircraft will have when it has acquired said particular separation relative to the followed aircraft;

deducing from this speed and from this altitude, the corresponding energy state of the following aircraft; and verifying whether this energy state is compatible or incompatible with the execution of a landing procedure.

Said means 19 are formed, more specifically, to inhibit the engagement of said device 1, if the energy state is incompatible with the execution of a landing procedure, and if said speed and said altitude are both values set in advance.

Furthermore, said unit 17 can also comprise means 24 for emitting a warning signal, for example of audible and/or visual type, if the energy state of the following aircraft is incompatible with the execution of a landing procedure, and if the speed and/or the altitude have been estimated (and not set in advance). This warning signal can be emitted to the crew of the aircraft, but also, in a particular embodiment, to an air traffic control station.

It is known that the landing capacity of an aircraft is linked to its capacity to lose energy. Also, to land in total safety, the total energy of the following aircraft must reach a low level, which depends mainly on its landing speed and the altitude of the runway. The device 1 according to the invention is able to detect, during a separation maneuver, an incompatibility situation for which the current energy state of the following aircraft is too high and therefore represents a surplus energy situation, and it is formed so as to automatically introduce, in case of detection of such a surplus energy situation, limitations enabling the following aircraft to maintain an energy state compatible with the execution of a landing. In such a surplus energy situation, priority is therefore given to maintaining the landing capacity at the cost of maintaining a separation (relative to a separation maneuver).

The surplus energy situations are detected by comparing a distance of value Xstandard or Xlimit, specified hereinbelow, with the distance between the aircraft and the threshold of the runway (used for the landing). When the difference between these two distances becomes less than a given threshold, speed limitations are automatically applied to the instructions calculated by the separation law (means 2). The choice of the reference distance (Xstandard or Xlimit), from which the detection is performed, is not fixed and can be of configurable type (available to the crew). The Xstandard and Xlimit values represent minimum distances necessary for the aircraft to reach the threshold of the runway at a predetermined altitude (for example at 50 feet, that is, at approximately 15 meters) if it follows descent profiles that respectively represent a standard descent and a limit descent. It will be noted that the choice of the Xstandard value ensures an optimized standard descent, while remaining comfortable for the aircraft and its passengers. Furthermore, the choice of the Xlimit value makes it possible to indicate with certainty that beyond it the aircraft will no longer be able to land, and imposes a maximum descent rate which is uncomfortable for the crew and the passengers of the aircraft. One example of calculation of these Xstandard and Xlimit distances is presented in the patent application FR-2 885 439 and is well known. The energy situation of the following aircraft is therefore considered as normal (or compatible with a landing procedure) as long as the distance between the following aircraft and the runway remains less than the chosen reference distance (Xstandard or Xlimit).

The device 1 according to the invention can be produced according to two different embodiments.

A first embodiment (not represented) is designed to generate a gradual deceleration of the following aircraft according to a predetermined law, when a surplus energy situation is detected and until the following aircraft returns to a normal energy state. The detection threshold is calculated, in this case, according to the rate of variation of the deceleration law.

In this first embodiment, the device 1 is such that:
the means 3 determine second guidance instructions making it possible to perform a gradual deceleration of the following aircraft according to the predetermined deceleration law; and
the unit 6 comprises integrated elements:
for comparing the horizontal distance, between the current position of the following aircraft and the threshold of a runway used by this following aircraft for its landing, to a minimum approach distance relative to a particular approach procedure with a view to a landing; and
for detecting an incompatibility situation when said horizontal distance, between the current position of the following aircraft and the threshold of a runway used by this following aircraft for its landing, is less than said minimum approach distance relative to a particular approach procedure with a view to a landing.

Figure 3:
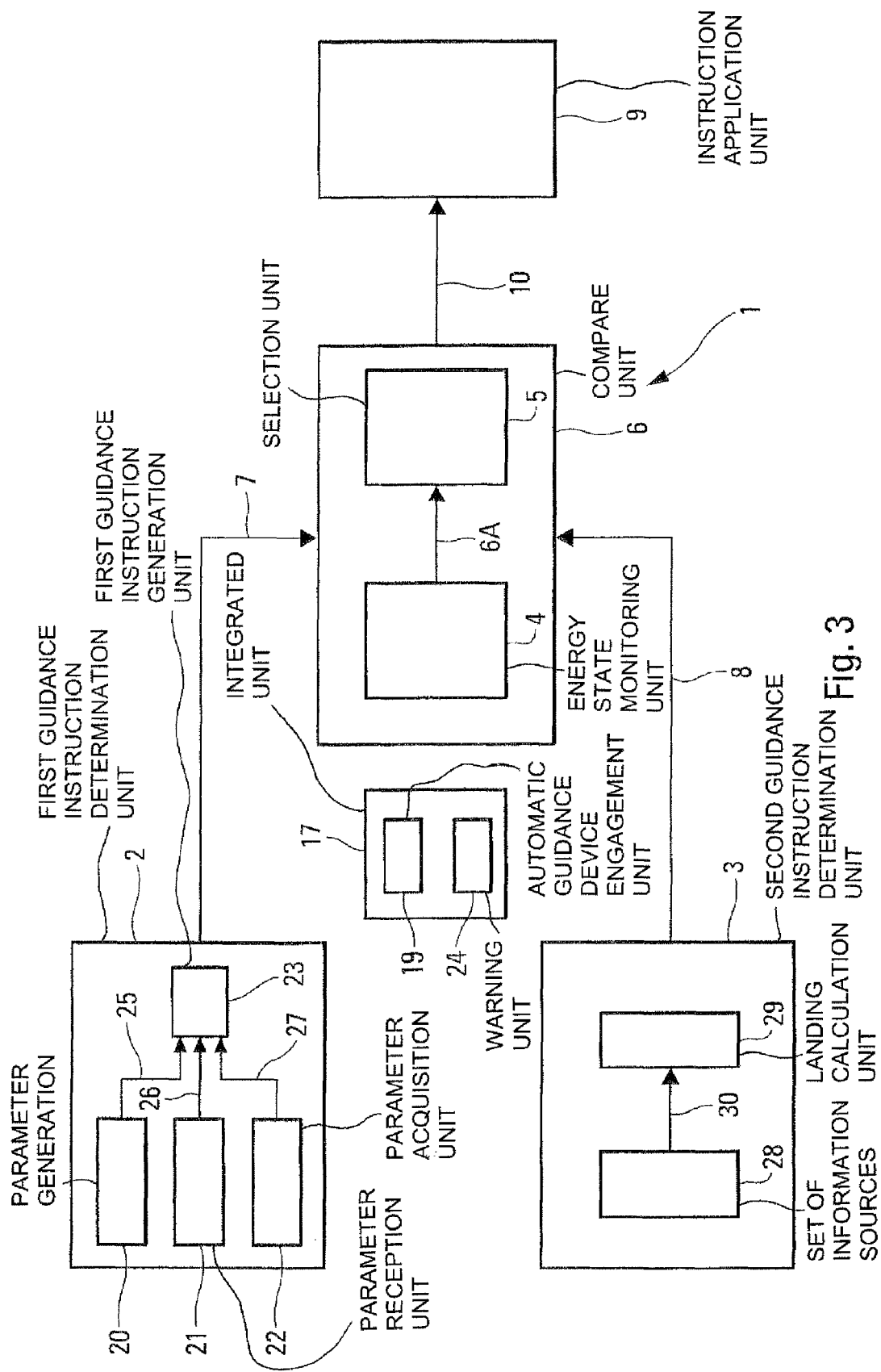
FIG. 3 is the block diagram of a preferred embodiment of a device according to the invention.

Furthermore, a second, more complex embodiment, which is represented in FIG. 3, provides for the application of speed saturations calculated from the descent profile (standard or limit) relative to the chosen reference distance, from the altitude of the following aircraft, from its aerodynamic configuration and from the wind. The application of these saturations is such that the aircraft exactly follows this descent profile and reaches the threshold of the runway at an altitude of 50 feet (approximately 15 meters). In this second embodiment, the detection threshold is calculated according to the difference between the speed of the following aircraft and the speed that it should have to observe the chosen descent profile. This second embodiment makes it possible to directly target the speed value best suited to the state of the following aircraft, but it also makes it possible to calculate, in advance, and at all parts of the separation trajectory of the following aircraft whose altitude is known, the maximum speed to be observed to maintain its landing capacity, and consequently supply the crew with information enabling it to predict surplus energy situations. This characteristic is of interest in assessing the compatibility between the implementation of an automatic separation maneuver and maintaining the landing capacity of the following aircraft before engaging the maneuver, from the predicted state of the following aircraft.

In this second embodiment, said device 1 is such that:
the means 2 calculate first guidance instructions corresponding to separation set points expressed as speed;
means 3 calculate a maximum speed that the following aircraft must observe to maintain a landing capacity, this maximum speed representing said second guidance instructions; and
the unit 6 compares said separation set points to said maximum speed, and it detects an incompatibility situation when said separation set points are greater than said maximum speed.

To do this, in this second embodiment, as represented in FIG. 3, said means 2 comprise:
means 20 for generating, in the usual way, parameters of the following aircraft, such as its position, its speed and/or its acceleration, which illustrate the state of said following aircraft;
means 21, for example usual radiocommunication means or digital data transmission means, for receiving in the usual way, from outside the following aircraft, parameters such as the position, the speed and/or the acceleration, which illustrate the state of the followed aircraft;
means 22 for acquiring, in the usual way, required separation parameters, such as the type of maneuver and the separation value, concerning the separation maneuver to be performed; and
means 23 which are linked via lines 25, 26 and 27 respectively to said means 20, 21 and 22 and which generate, in the usual way, from the information received from said means 20, 21 and 22, said first guidance instructions which represent separation set points in terms of speed.

Furthermore, in this second embodiment, said means 3 comprise:
set 28 of information sources which supply in particular:
the current altitude of the following aircraft;
the descent profile (of standard type or of limit type) selected;
the current aerodynamic configuration of the following aircraft; and
its wind characteristics; and
means 29 which are linked via a link 30 to said set 28 and which calculate, in the usual way, from the preceding information received from said set 28, a maximum speed making it possible to assure the landing capacity of the following aircraft.

Furthermore, said means 4 of said unit 6 compare the separation set points in terms of speed, calculated by the means 2, to the maximum speed calculated by the means 3, and they command said means 5 so that the latter transmit via the link 10:
said separation set points, as long as the latter remain less than said maximum speed; and
said maximum speed, immediately and for as long as said separation set points are greater than or equal to said maximum speed.

In the embodiment of FIG. 3, the device 1 also makes it possible to supply the crew with information on the future energy situation of the aircraft before engaging the maneuver and notably at the predicted moment when the following aircraft has reached the required separation. This makes it possible not to undertake a separation maneuver which risks bringing the following aircraft quickly into a surplus energy situation. Furthermore, if a maneuver seems compatible with maintaining the landing capacity, that is, if, at the predicted moment when the following aircraft has reached the required separation, the landing capacity is maintained, the device 1 makes it possible to check that this will actually be the case and that the aircraft will keep this capacity once the separation is acquired, and this until its landing (by limiting, if necessary, in real time, the speed of said following aircraft).

The automatic separation function of the device 1 contains a prediction function capable of predicting, when it is not fixed, the point of acquisition at which the following aircraft will have reached the separation demanded by the air traffic controller. This function is used to supply information to the pilots enabling them to follow the progress of the maneuver. It can also be used, in the content of the invention, to predict the altitude that the following aircraft will have at this point of acquisition according to its flight plan. Furthermore, its speed at the point of acquisition corresponds to that which the followed aircraft will have at this point.

Two assumptions can then be made. The first accepts that the following aircraft knows the speed intentions of the followed aircraft, thanks notably to a radio transmission. The second assumption is based on the absence of knowledge of the speed intentions of the followed aircraft by the following aircraft.

In the case where the following aircraft knows the speed profile of the followed aircraft, the only uncertainty for supplying an indication that the landing capacity is maintained, once the separation is acquired, concerns the actual point of acquisition of this separation. In most separation maneuvers, the point of acquisition is fixed and belongs to the flight plan of each of the two aircraft. In this case, the device 1 is capable of predicting with accuracy whether, at this point of acquisition, the following aircraft will still have the capacity to land, and this information can be used by the means 19 to allow or prevent the engagement of the separation maneuver. If the point of acquisition is not fixed, the device 1 uses usual predictions from systems on board the following aircraft to estimate the position of this point. These predictions are updated continually, because they contain a level of uncertainty linked in particular to the atmospheric conditions. The device 1 does not in this case inhibit the separation maneuver, but it notifies the air traffic controller and the crew, in particular using means 24, to signal a risky maneuver. If the following aircraft does not acquire the required separation before the predicted point of acquisition on engaging the maneuver, the maneuver will not be compatible with maintaining the landing capacity of this aircraft.

If the intentions of the followed aircraft are not known, the assumption that the followed aircraft keeps a constant speed applies. In this case, it is only possible to evaluate a priori the feasibility of the maneuver, even if the point of acquisition of the separation is fixed by the maneuver.

If the followed aircraft accelerates, the real distance necessary for the following aircraft to reach the altitude of the runway at the point of acquisition will be greater than that predicted at the moment of engagement of the maneuver. The maneuver will then rightly be rejected. However, if the followed aircrafts close down, which is the most probable case on approach, the real distance necessary for the following aircraft to reach the altitude of the runway at the point of acquisition will be less than that predicted at the moment of engagement of the maneuver. To avoid rejecting the engagement of maneuvers which would have been feasible based on energy prediction criteria, the maneuver feasibility information supplied by the invention must not make it possible, in this case, to inhibit the maneuver, but to act as a warning to the air traffic controller and the crew to signal (via the means 24) a risky maneuver. If the followed aircraft does not slow down, the maneuver will not be compatible with maintaining the landing capacity of the following aircraft.

The automatic guidance device 1 according to the invention therefore makes it possible to automatically detect, predict and/or correct surplus energy situations linked to the execution of automatic separation maneuvers and, consequently, notably avoid unwanted go-arounds.

The invention claimed is:

1. A method of automatically guiding separation of a follow aircraft from a lead aircraft, the method comprising the steps of:
    a) determining first guidance instructions based on speed that enables a desired separation between the lead and follow aircraft;
    b) determining second guidance instructions based on speed for performing a desired landing procedure for the follow aircraft;
    c) monitoring current energy state of the follow aircraft to detect an incompatibility situation in which the current energy state of the follow aircraft is incompatible with execution of the desired landing procedure, and wherein the incompatibility situation is detected when horizontal distance between a current position of the follow aircraft and a threshold of a landing runway is less than a minimum approach distance which represents minimum distance for the follow aircraft to reach the threshold of the runway as it follows a descent profile of the desired approach procedure; and
    d) applying the first guidance instructions or the second guidance instructions to the follow aircraft, wherein:
        d1) said first guidance instructions are applied in an absence of detecting the incompatibility situation; and
        d2) said second guidance instructions are applied upon detection of the incompatibility situation and for as long as the incompatibility situation is detected.

2. The method as claimed in claim 1, wherein:
    in the step b), the second guidance instructions produce a gradual deceleration of the follow aircraft according to a predetermined deceleration law; and
    in the step c):
        horizontal distance between a current position of the follow aircraft and a threshold of a landing runway is compared to a minimum approach distance relative to a desired approach procedure; and
        the incompatibility situation is detected when said horizontal distance between the current position of the follow aircraft and the threshold of the landing runway is less than said minimum approach distance.

3. The method as claimed in claim 1, wherein:
    in the step a), the first guidance instructions are calculated, corresponding to separation set points expressed as speed;
    in the step b), a maximum speed of the follow aircraft is calculated representing said second guidance instructions that enables the follow aircraft to follow a desired descent profile for landing; and
    in the step c), said separation set points are compared to said maximum speed and the incompatibility situation is detected when said separation set points are greater than said maximum speed.

4. The method as claimed in claim 1, wherein:
speed and altitude of the follow aircraft are taken into account in determining the desired separation;
from said speed and said altitude, the corresponding energy state of the follow aircraft is deduced; and
a check is carried out on the deduced energy state for compatibility with the execution of the desired landing procedure.

5. The method as claimed in claim 4, wherein said speed and said altitude are preset values.

6. The method as claimed in claim 4, wherein at least one of the speed and the altitude of the follow aircraft is estimated, and upon detection of the incompatibility situation, a warning signal is emitted.

7. A device for automatically guiding separation of a follow aircraft from a lead aircraft, comprising:
first guidance instruction unit that determines first guidance instructions based on speed that enables a desired separation between the lead and follow aircraft; and
second guidance instruction unit that determines second guidance instructions based on speed for performing a desired landing procedure for the follow aircraft;
energy monitoring unit that monitors current energy state of the follow aircraft to detect an incompatibility situation in which the current energy state of the follow aircraft is incompatible with execution of the desired landing procedure, and wherein the incompatibility situation is detected when horizontal distance between a current position of the follow aircraft and a threshold of a landing runway is less than a minimum approach distance which represents minimum distance for the follow aircraft to reach the threshold of the runway as it follows a descent profile of the desired approach procedure; and
application unit that applies to the follow aircraft:
said first guidance instructions in an absence of detecting the incompatibility situation; and
said second guidance instructions upon detection of the incompatibility situation and for as long as the incompatibility situation is detected.

8. The device as claimed in claim 7, further comprising a verification unit having integrated elements that:
take into account speed and altitude of the follow aircraft in determining the desired separation;
deduce from the speed and altitude of the follow aircraft, the corresponding energy state of the follow aircraft; and
check the deduced energy state for compatibility of the execution of the desired landing procedure.

9. An aircraft, comprising the device of claim 7.

10. A method of automatically guiding separation of a follow aircraft from a lead aircraft, the method comprising the steps of:
a) determining first guidance instructions based on speed that enables a desired separation between the lead and follow aircraft;
b) determining second guidance instructions based on speed for performing a desired landing procedure for the follow aircraft;
c) monitoring current energy state of the follow aircraft to detect an incompatibility situation in which the current energy state of the follow aircraft is incompatible with execution of the desired landing procedure; and
d) applying the first guidance instructions or the second guidance instructions to the follow aircraft, wherein:
d1) said first guidance instructions are applied in an absence of detecting the incompatibility situation; and
d2) said second guidance instructions are applied upon detection of the incompatibility situation and for as long as the incompatibility situation is detected,
and wherein:
speed and altitude of the follow aircraft are preset values that are taken into account in determining the desired separation;
from said speed and said altitude, the corresponding energy state of the follow aircraft is deduced; and
a check is carried out on the deduced energy state for compatibility with the execution of the desired landing procedure.

\* \* \* \* \*